(12) United States Patent
Mosko et al.

(10) Patent No.: US 9,130,887 B2
(45) Date of Patent: Sep. 8, 2015

(54) HASH-BASED FORWARDING OF PACKETS WITH HIERARCHICALLY STRUCTURED VARIABLE-LENGTH IDENTIFIERS OVER ETHERNET

(71) Applicant: Palo Alto Research Center Incorporated, Palo Alto, CA (US)

(72) Inventors: Marc E. Mosko, Santa Cruz, CA (US); Ramesh C. Ayyagari, Cupertino, CA (US); Subbiah Kandasamy, Fremont, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 124 days.

(21) Appl. No.: 14/069,286

(22) Filed: Oct. 31, 2013

(65) Prior Publication Data
US 2015/0117453 A1 Apr. 30, 2015

(51) Int. Cl.
*H04L 12/28* (2006.01)
*H04L 12/743* (2013.01)
*H04L 29/08* (2006.01)

(52) U.S. Cl.
CPC ........... *H04L 45/7457* (2013.01); *H04L 67/327* (2013.01)

(58) Field of Classification Search
None
See application file for complete search history.

(56) References Cited

U.S. PATENT DOCUMENTS

| | | | | |
|---|---|---|---|---|
| 2010/0195654 | A1* | 8/2010 | Jacobson et al. | 370/392 |
| 2010/0195655 | A1* | 8/2010 | Jacobson et al. | 370/392 |
| 2012/0158973 | A1* | 6/2012 | Jacobson et al. | 709/227 |
| 2014/0146823 | A1* | 5/2014 | Angst et al. | 370/401 |
| 2014/0146824 | A1* | 5/2014 | Angst et al. | 370/401 |

OTHER PUBLICATIONS

Zhang et al, Named Data Networking (NDN) Project, PARC Tech Report, 27 pages, Oct. 2010.*

* cited by examiner

*Primary Examiner* — Frank Duong
(74) *Attorney, Agent, or Firm* — Shun Yao; Park, Vaughan, Fleming & Dowler LLP

(57) ABSTRACT

A system is provided for forwarding packets with hierarchically structured variable-length identifiers (HSVLIs) over Ethernet. The system receives an Ethernet-encapsulated registration message from a content server, which includes a packet containing an HSVLI. A destination MAC of the registration message is an Ethernet group MAC address. The system then creates an entry in a forwarding information base corresponding to the HSVLI indicating a MAC address of the content server and a port on which the registration message is received. The system receives an interest packet from a client which includes the HSVLI. The packet has the Ethernet group MAC address as its destination MAC address and the client's MAC address as its source MAC address. The system forwards the interest packet to the content server, which has the content server's MAC address as its destination MAC address and a local switch's MAC address as its source MAC address.

21 Claims, 8 Drawing Sheets

HASH-BASED FORWARDING OF PACKETS WITH HIERARCHICALLY STRUCTURED VARIABLE-LENGTH IDENTIFIERS OVER ETHERNET

RELATED APPLICATION

The subject matter of this application is related to the subject matter in the following applications:

U.S. patent application Ser. No. 12/565,005, now U.S. patent Ser. No. 12/565,005, entitled "SYSTEM FOR FORWARDING A PACKET WITH A HIERARCHICALLY STRUCTURED VARIABLE-LENGTH IDENTIFIER," by inventors Van L. Jacobson and James D. Thornton, filed 23 Sep. 2009;

U.S. patent application Ser. No. 12/638,478, now U.S. patent Ser. No. 12/638,478, entitled "SYSTEM FOR FORWARDING PACKETS WITH HIERARCHICALLY STRUCTURED VARIABLE-LENGTH IDENTIFIERS USING AN EXACT-MATCH LOOKUP ENGINE," by inventors Van L. Jacobson and James D. Thornton, filed 15 Dec. 2009; and U.S. patent application Ser. No. 12/640,968, now U.S. patent Ser. No. 12/640,968, entitled "METHOD AND SYSTEM FOR FACILITATING FORWARDING A PACKET IN A CONTENT-CENTRIC NETWORK," by inventors Van L. Jacobson and James D. Thornton, filed 17 Dec. 2009;

the disclosures of which are incorporated by reference in their entirety.

BACKGROUND

1. Field

The present disclosure relates generally to facilitating communication over a data network. More specifically, the present disclosure relates to a system and method for facilitating hash-based forwarding of packets with hierarchically structured variable-length identifiers over Ethernet.

2. Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, the Internet Protocol (IP) and Ethernet protocol, are both based on location-based addresses. That is, a consumer of content can only receive the content by explicitly requesting the content from an address (e.g., IP address or Ethernet media access control (MAC) address) closely associated with a physical object or location. This restrictive addressing scheme is becoming progressively inadequate for meeting the ever-changing network demands.

Recently, content centric network (CCN) architectures have been proposed in the industry. CCN brings a new approach to content transport. Instead of having network traffic viewed at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can also be associated with meta-data describing or augmenting the piece of content with information such as authentication data, creation date, content owner, etc.

In CCN, content objects and interests are identified by their names, which is typically a hierarchically structured variable-length identifier (HSVLI). Because these names have variable lengths, it is difficult to forward packets with HSVLIs at line speed with high throughput. In addition, there are a number of challenges in forwarding such packets over Ethernet.

SUMMARY

One embodiment of the present invention provides a system for forwarding packets with hierarchically structured variable-length identifiers (HSVLIs) over Ethernet. During operation, the system receives an Ethernet-encapsulated registration message from a content server, wherein the registration message includes a packet containing an HSVLI, and wherein a destination media access control (MAC) of the registration message is an Ethernet group MAC address. The system then creates an entry in a forwarding information base corresponding to the HSVLI, wherein the entry indicates a MAC address of the content server and a port on which the registration message is received. The system subsequently receives an interest packet from a client which includes the HSVLI, wherein the packet is Ethernet encapsulated and has the Ethernet group MAC address as its destination MAC address and the client's MAC address as its source MAC address. Next, the system forwards the interest packet to the content server, wherein the forwarded interest packet has the content server's MAC address as its destination MAC address and a local switch's MAC address as its source MAC address.

In a variation on this embodiment, the interest packet contains a first value which is a hash derived based on the entire HSVLI and optionally additional information in the packet, and a second value which is a hash derived on the subset of the HSVLI components.

In a variation on this embodiment, the system receives a content object packet from the content server in response to the interest, wherein the content object packet has the switch's MAC address as its destination address and the content server's MAC address as its source address. The system then forwards the content object packet to the client, wherein the forwarded packet has the client's MAC address as its destination MAC address and the switch's MAC address as its source MAC address.

In a further variation, the system caches the content object packet.

In a variation on this embodiment, the system maintains a pending interest table. Subsequent to receiving the interest packet, the system creates an entry in the pending interest table, wherein the entry indicates a port on which the interest packet is received and the client's MAC address.

In a variation on this embodiment, the system maintains the forwarding information base, wherein a respective entry in the forwarding information base indicates an egress port and a destination MAC address of a device reachable via the egress port.

In a variation on this embodiment, the system searches a local content store for content corresponding to the interest packet.

BRIEF DESCRIPTION OF THE FIGURES

In the figures, like reference numerals refer to the same figure elements.

DETAILED DESCRIPTION

Overview

Figure 1:
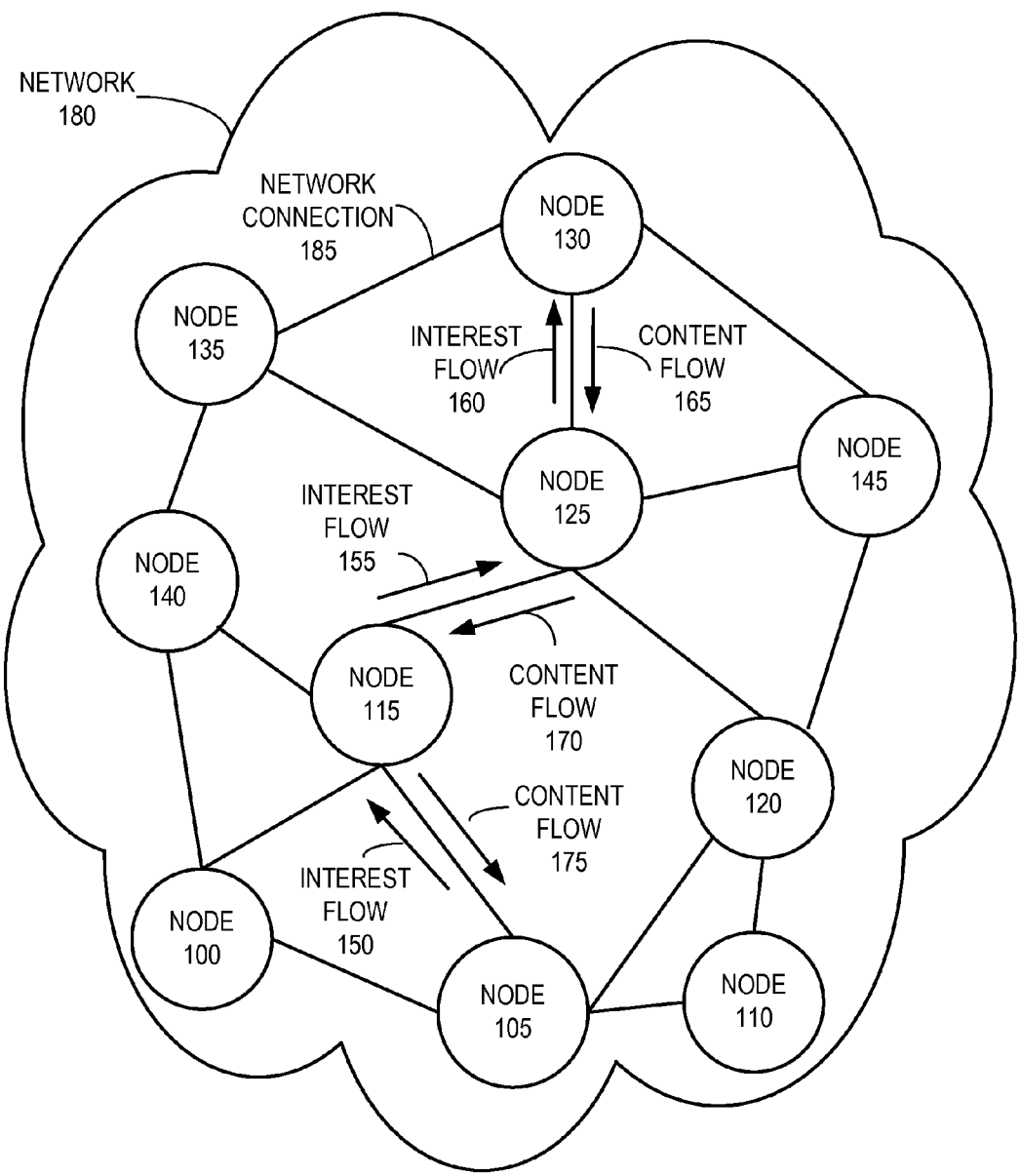
FIG. 1 illustrates an exemplary network where packets have hierarchically structured variable-length identifiers (HSVLIs) in accordance with an embodiment.

Embodiments of the present invention provide a system and method for hash-based forwarding of CCN packets with Hierarchically Structured Variable Length Identifiers (HSVLIs) over Ethernet, thus simplifying the work done at a packet forwarder. An Ethernet multicast group address is used as a destination MAC address in a CCN packet when such packet is intended to be delivered in an Ethernet broadcast domain. A CCN-enabled Ethernet switch can then forward CCN packets between a CCN client and CCN content server by swapping Ethernet source and destination MAC address in the Ethernet header, thereby facilitating efficient CCN forwarding over Ethernet.

With respect to hash-based forwarding of CCN packets, a first byte string, referred to as the Similarity Hash (SH), represents the query in an Interest. The Similarity Hash remains invariant as a packet moves through the network. A second byte string, called the Forwarding Hash (FH), represents the longest matching prefix in the routing tables in various forwarding devices (e.g., routers, switches, etc.) along a data path that matches the Interest name. The Forwarding Hash may change hop-by-hop if the underlying routing tables change, such that it always represents the best match at the previous hop. A Content Object, sent in response to an SH/FH Interest, carries the SH/FH header along the return path so the Content Object may be forwarded along the proper path.

In general, CCN uses two types of messages: Interests and Content Objects. An Interest carries the hierarchically structured variable-length identifier (HSVLI), also called the "name," of a Content Object and serves as a request for that object. If a network element (e.g., router) receives multiple interests for the same name, it may aggregate those interests. A network element along the path of the Interest with a matching Content Object may cache and return that object, satisfying the Interest. The Content Object follows the reverse path of the Interest to the origin(s) of the Interest. A Content Object contains, among other information, the same HSVLI, the object's payload, and cryptographic information used to bind the HSVLI to the payload.

The terms used in the present disclosure are generally defined as follows (but their interpretation are not limited to such):

"HSVLI": Hierarchically structured variable length identifier, also called a Name. It is an ordered list of Name Components, which may be variable length octet strings. In human-readable form, it can represented in a format such as ccnx:/path/part. There is not a host or query string. As mentioned above, HSVLIs refer to content, and it is desirable that they be able to represent organizational structures for content and at least partially meaningful to humans. An individual component of a HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs. For example, an HSVLI indicating an interest in "/parc/home/bob" will match both "/parc/home/bob/test.txt" and "/parc/home/bob/bar.txt." The longest match, in terms of the number of name components, is considered the best because it is the most specific.

"Interest": A request for a Content Object that specifies a HSVLI name prefix and other optional selectors to choose among multiple objects with the same name prefix. Any Content Object whose name matches the Interest name prefix and selectors satisfies the Interest.

"Content Object": A data object sent in response to an Interest. It has a HSVLI name and a Contents payload that is bound together via a cryptographic signature. Optionally, all Content Objects have an implicit terminal name component made up of the SHA-256 digest of the Content Object. In one embodiment, the implicit digest is not transferred on the wire, but is computed at each hop, if needed.

"Similarity Hash": In an Interest, the Name and several fields called Selectors limit the possible content objects that match the interest. Taken together, they uniquely identify the query in the Interest. The Similarity Hash is a hash over those fields. Two interests with the same SH are considered identical queries.

"Flatname": a CCN name organized as an ordered set of a varint (see below) length and name component bytes.

"Varint": A variable sized unsigned integer encoded, for example, as a series of 7-bit values in big-endian ordered octets. Each high-order octet bit is a continuation bit; if it is set, then the next octet is part of the value.

As mentioned before, an HSVLI indicates a piece of content, is hierarchically structured, and includes contiguous components ordered from a most general level to a most specific level. The length of a respective HSVLI is not fixed. In content-centric networks, unlike a conventional IP network, a packet may be identified by an HSVLI. For example, "abcd/bob/papers/ccn/news" could be the name of the content and identifies the corresponding packet(s); i.e., the "news" article from the "ccn" collection of papers for a user named "Bob" at the organization named "ABCD." To request a piece of content, a node expresses (e.g., broadcasts) an interest in that content by the content's name. An interest in a piece of content can be a query for the content according to the content's name or identifier. The content, if available in the network, is routed back to it from any node that stores the content. The routing infrastructure intelligently propagates the interest to the prospective nodes that are likely to have the information and then carries available content back along the path which the interest traversed.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate interests or originate content.

In accordance with an embodiment of the present invention, a consumer can generate an Interest in a piece of content and then send that Interest to a node in network 180. The piece of content can be stored at a node in network 180 by a publisher or content provider, who can be located inside or outside the network. For example, in FIG. 1, the Interest in a piece of content originates at node 105. If the content is not available at the node, the Interest flows to one or more nodes coupled to the first node. For example, in FIG. 1, the Interest flows (interest flow 150) to node 115, which does not have the content available. Next, the Interest flows (interest flow 155) from node 105 to node 125, which again does not have the content. The Interest then flows (interest flow 160) to node 130, which does have the content available. The flow of the content then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the Interest generation node (node 105) can participate in caching local copies of the content as it travels across the network. Caching reduces the network load for a second subscriber located in proximity to other subscribers by implicitly sharing access to the locally cached content.

CCN Forwarding Over Ethernet

Figure 2A:
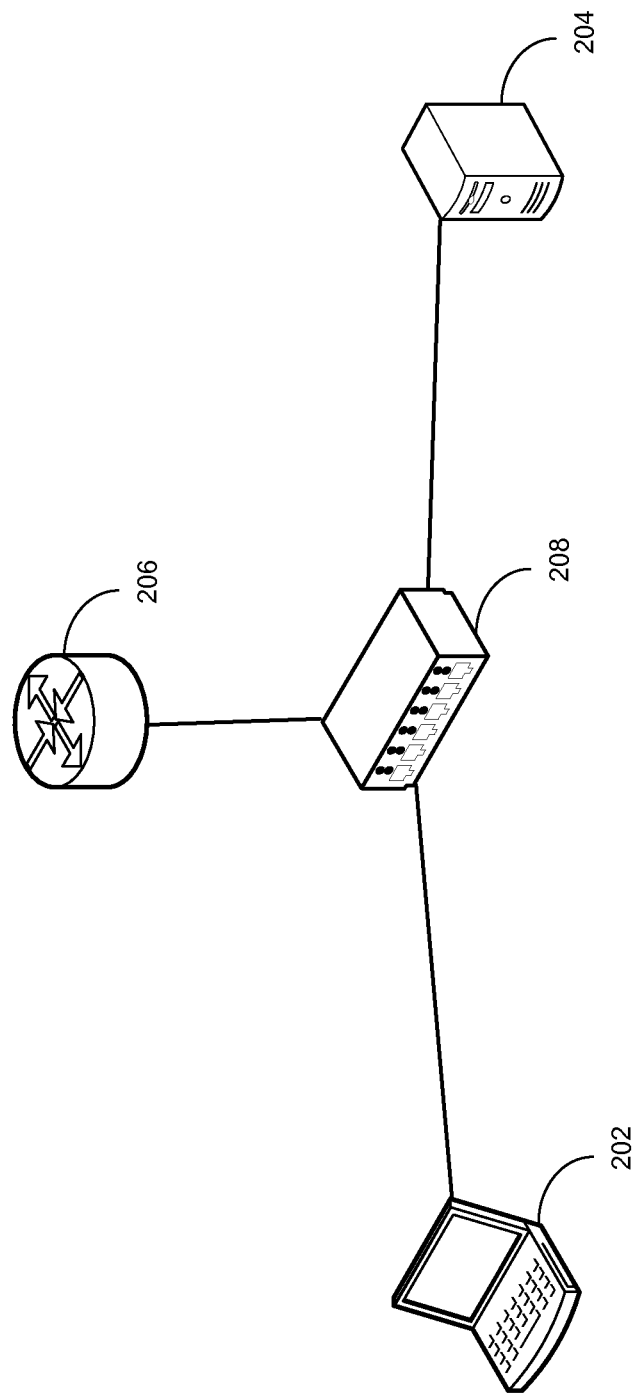
FIG. 2A illustrates an exemplary network topology of a CCN client and CCN sever coupled over Ethernet, in accordance with an embodiment of the present invention.

FIG. 2A illustrates an exemplary network topology of a CCN client and CCN sever coupled over Ethernet, in accordance with an embodiment of the present invention. In this example, a client 202 and a content server 204 are coupled together by a convention Ethernet hub 208. Also coupled to the Ethernet hub 208 is a CCN-enabled Ethernet switch 206. These devices form an Ethernet broadcast domain. Because Ethernet is the underlying data link layer, all the CCN packets are expected to be encapsulated in an Ethernet header. For CCN packets that are meant to be multicast packets (for example, a registration packet from content server 204), an Ethernet multicast group address can be used as the destination MAC address in the Ethernet header. By setting the destination MAC address to the Ethernet group address, client 202 or server 204 can direct their CCN packets to CCN-enabled Ethernet switch 206.

Figure 2B:
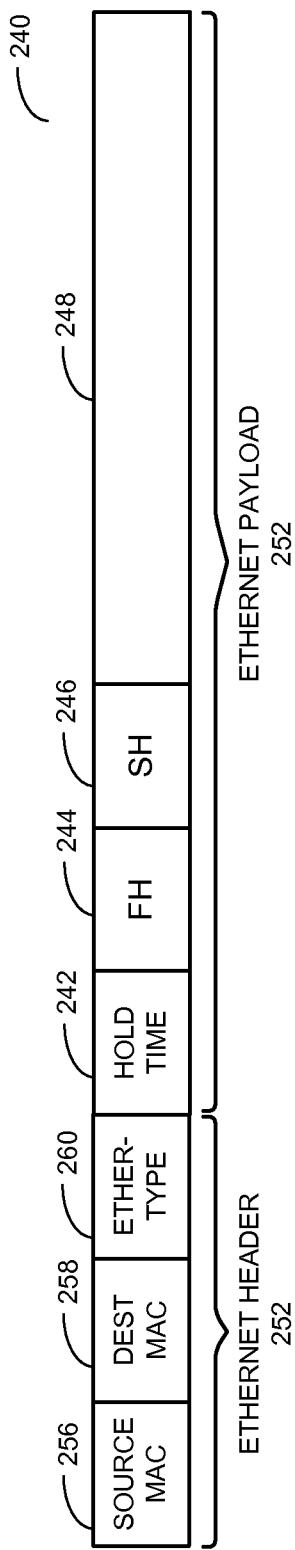
FIG. 2B illustrates an exemplary Ethernet packet format for carrying a CCN packet with hash-based forwarding information, in accordance with an embodiment of the present invention.

FIG. 2B illustrates an exemplary Ethernet packet format for carrying a CCN packet with hash-based forwarding information, in accordance with an embodiment of the present invention. In this example, an Ethernet-encapsulated CCN packet includes an Ethernet header 252 and Ethernet payload 252. Ethernet header 252 includes a source MAC address 256, a destination MAC address 258, and an EtherType field 260. In one embodiment, EtherType field 260 contains a value which indicates that payload 252 contains a CCN packet.

Ethernet payload 252 in turn contains a CCN packet payload 248 and a hash-forwarding header which includes a holdtime field 242, a forwarding hash 244, and a similarity hash 246. These hash forwarding header fields are described in more details below.

Figure 2C:
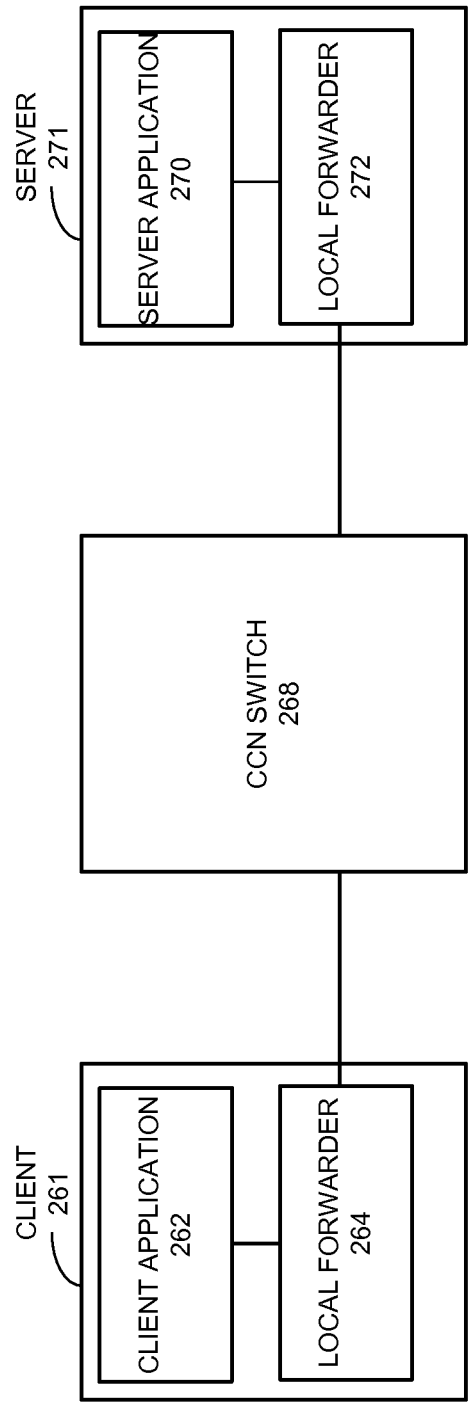
FIG. 2C illustrates an exemplary process of facilitating CCN hash-based forwarding over Ethernet, in accordance with an embodiment of the present invention.

FIG. 2C illustrates an exemplary process of facilitating CCN hash-based forwarding over Ethernet, in accordance with an embodiment of the present invention. In this example, a client 261 and a content server 271 are coupled to a CCN-enabled Ethernet switch 268. Within client 261 are a client application 262 and a local CCN forwarder 264 (which can be implemented as part of the kernel running on client 261). Similarly, within server 271 are a server application 270 and a local forwarder 272 (which can be implemented as part of server 271's kernel).

During operation, server 271 first creates a kernel socket for server application 270 and binds the socket to the name prefix of a piece of content hosted on server 271, say "/a/b." At the same time, server local forwarder 272 creates a local FIB entry corresponding to "/a/b" which points to the server application socket.

Subsequently, server 271 sends a prefix registration message to Ethernet switch 268. The source MAC address of the registration message is set to be the MAC address of server 271. The destination MAC address is set to be a predetermined Ethernet group address designated for CCN use.

After switch 268 receives the prefix registration message, it creates a corresponding FIB entry which includes a forwarding hash and points to the port on which the registration message is received as well as server 271's MAC address. In addition, switch 268 can optionally propagate this FIB entry to other devices in the CCN network. In one embodiment, server 271 can periodically refresh the validity of this FIB entry with switch 268.

When client 261 wishes to obtain a piece of content corresponding to "/a/b," client 261 first generate a corresponding socket that binds to this name prefix. The kernel in client 261 then determines the appropriate forwarding hash and similarity hash for the content. Client 261 then assembles an Interest packet with the generated FH and SH and encapsulate this Interest packet with an Ethernet header. The destination MAC address of this Ethernet header is set to be the Ethernet group MAC address designated for CCN. In addition, the source MAC address of the Ethernet header is set to be client 261's MAC address. Subsequently, client 261 sends the Ethernet encapsulated Interest packet to the Ethernet broadcast domain, which in turn allows switch 268 to receive the Interest packet. Client 261 also creates a PIT entry corresponding to the Interest's FH and SH, and pointing back to the client application socket.

Switch 268 then processes the Interest packet (see description in conjunction with FIG. 4) by look up the SH and FH in its FIG and forwards the Interest to server 271. Prior to forwarding the Interest packet, switch 268 replaces the Ethernet destination MAC address in the Ethernet header with the MAC address of server 271, and replaces the source MAC address with switch 268's own MAC address (i.e., the MAC address of the egress port on which the Interest packet is to be forwarded). Note that the egress port and server 271's MAC address are both retrieved from the corresponding FIB entry. In addition, switch 268 creates its own PIT entry corresponding to the Interest's FH/SH and pointing to the port on which the Interest is received and client 261's MAC address.

After server 271 receives the Interest, local forwarder 272 first creates a local PIT entry corresponding to the Interest's FH and SH and pointing back to the port coupled to switch 268 with switch 268's MAC address. Local forwarder 272 further looks up the FH and SH in its local FIB and forwards the Interest to server application 270. In turn, server application 270 sends the corresponding Content Object via the server application socket. Local forwarder 272 then matches the Content Object to its PIT entry. Local forwarder 272 then attaches the appropriate SH and FH to the Content Object, encapsulates the Content Object with an Ethernet header, and sends the packet to switch 268. Note that the destination MAC address in the Ethernet header is set to be the MAC address of the corresponding port on switch 268. The source MAC address in the Ethernet header is set to be the MAC address of server 271. Local forwarder 272 then removes the corresponding PIT entry.

After receiving the Content Object, switch 268 performs a lookup in its PIT based on the Content Object's SH and FH. Switch 268 then encapsulates the Content Object with an Ethernet header and forwards the packet to client 261. Note that switch 268 replaces the destination MAC in the Ethernet header with the MAC address of client 261, and replaces the source MAC address with its own MAC address.

After client 261 receives the Content Object, local forwarder 264 performs a lookup in its PIT based on the Content Object's SH and FH. Subsequently, local forwarder 264 forwards the received Content Object to the client application socket and removes the corresponding entry in its PIT.

Optionally, after the Content Object is successfully delivered to client 261, server 271 can optionally send an deregistration message to switch 268 and removes the server application socket.

Hash Forwarding

Hash forwarding relies on each node using the same hash function to encode name prefixes and compute similarity hashes. The hash function and its usage for Hash Forwarding is described below.

In general, a CCN packet, either for an interest or content object, has a header that includes a Similarity Hash (SH) and a Forwarding Hash (FH). SH is used to uniquely identify a piece of content, and can be a hash of the name and one or more fields in the packet. In one embodiment, SH is only computed by the source node that initiates an Interest, and optionally verified by an authoritative source node generating content or responding from a long-term repository. Any two Interests containing the same SH are considered to contain a request for the same piece of content. Any Content Object packet that contains the same SH is considered to be a correct response to the corresponding Interest. In essence, SH can be used in place of the name for purposes of identifying a piece of content.

FH is computed based on one or more components of an Interest packet's name. In general, the source node of an Interest packet may compute FH based on the highest-level hierarchy of the name components (wherein the highest hierarchy is "/"). As the Interest packet travels through the network at each forwarder, the FH may or may not be updated based on the longest match conducted at each forwarder. Every time the FH is updated, it is updated to a hash that corresponds to a more specific subset of the name components. For example, for an Interest packet with a name "/apple/pie/is/good," at the source node a packet's FH might be H{/}. As the packet is forwarded through the network, this FH can be updated to H{/apple/pie/is} and later to H{/apple/pie/is/good}. In general, the FH of a packet could become more or less specific with respect to the name components (which means the match to the name becomes "longer" or "shorter") along the data path toward the destination.

The high-level of CCN hash forwarding operates as follows. A node issues an Interest for a Content Object and receives back at most one Content Object per Interest it sends. The Content Object's name is expected to be equal to or at least match a suffix of the Interest name, and to satisfy the various selectors in the Interest. In embodiments of the present invention, the system speeds up this processing by pre-computing the SH and longest-matching prefix (LMP) FH. The assumption is that the LMP FH does not change frequently in-route, and that intermediate nodes do not need to do much expensive longest match for CCN flatnames. In particular, a forwarder does not necessarily evaluate the name or selectors when matching content in its Content Store (which serves as a cache for previously seen Content Objects). It may use exact match on the SH.

A forwarder typically maintains several data structures: The Pending Interest Table (PIT) tracks outstanding Interests the forwarder has seen, for which the forwarder is awaiting a response. It also aggregates similar Interests (Interest with the same Similarity Hash), so one Content Object may be replicated and forwarded to multiple reverse paths corresponding to multiple pending Interests. The PIT tracks the interfaces out of which an Interest has been sent and ensures that similar Interests are not sent multiple times out the same interfaces. The PIT also ensures that similar Interests can flow in all directions. A forwarder, for example, with three interfaces 1, 2 and 3, may forward an interest received from interface 1 toward interfaces 2 and 3. At a later time, it receives a similar Interest from Interface 2. It may forward that Interest out of interface 1, but not 3.

The Content Store (CS) is an optional component. It stores recently seen or high-value Content Objects so later requests for the same object can be answered without forwarding an Interest. Cache policy and retention policy can be applied.

The Forwarding Information Base (FIB) contains information indicating the Interest forwarding routes. Typically, a routing protocol is used to populate the FIB. In one embodiment, the entries in the FIB are indexed based on the Forwarding Hashes.

In general, a forwarder matches both the SH and FH of an Interest on the return path of a Content Object. This is because a malicious user could put in an SH for /popular/content and an FH for a /colluding/site, for example. The content object form /colluding/site would have malicious content, but an SH for /popular/content would be benign. If forwarders do not validate that the Content Object matches the full pending Interest with both SH and FH, and only reverse-path forwards with the SH, the malicious content could pollute the network.

To summarize the behavior of forwarding, an Interest is forwarded based on its FH. If an intermediate node has a more specific route (i.e., a forwarding entry that matches a longer portion of the name), it may update the FH to the more specific hash. When a Content Object is returned, an intermediate node will re-swap the FH label. When an intermediate node receives a Content Object, it verifies that it came from the expected direction, based on the PIT entry and SH/FH headers. An exception to this is if an Interest was routed along the default route (an empty FH), then the FH header in the Content Object is not swapped.

A PIT entry stores the SH, which is invariant in forwarding, the ingress FH, and the egress FH. The egress FH matches a Content Object's FH when it is received, and the ingress FH is label swapped to the Content Object when it is reverse-path forwarded toward the owner of the Interest. It is possible that the PIT stores multiple ingress FH's.

During operation, when a node creates an Interest, the node encapsulates the Interest in a header. It computes the Similarity Hash and places it in the header's SH field. If the node has knowledge of the proper Forwarding Hash, it places the FH in the FH field. The node then sends the Interest packet to the next-hop forwarder.

A node may obtain the FH in several ways: hash the first name component; use a directory service; use the FH returned in a Content Object from a previous Interest for the same prefix; or encode the FH in a specific link format.

When a forwarder receives an Interest on an ingress interface, it performs the following actions: The forwarder looks up the SH/FH in the PIT. If no entry exists, it creates a PIT entry for the Interest, then proceeds to check the Content Store. To create a PIT entry, the forwarder records the SH and FH of the Interest and notes the ingress port on which the Interest is received. If the remaining time of the PIT entry is less than the Interest's requested holdtime, the forwarder can extend the PIT entry's remaining time. Note that the holdtime is a suggested maximum time to hold the Interest in a PIT. The forwarder then proceeds to forward the Interest.

If a forwarder implements a Content Store, it can lookup the FH in the FIB, and determine if there is a more specific route FH' (which is an FH corresponding to a longer, or more specific, portion of the name). If not, set FH'=FH. The forwarder then matches the SH and FH' in the Content Store. If there is an exact match, the forwarder returns the Content Object and consumes the PIT entry. The returned object carries SH/FH, unless FH was the default route, in which case it carries SH/FH'. If there is no exact match in the Content Store, the forwarder forwards the Interest.

To forward the Interest, the forward first looks up the FH in the FIB and finds the longest matching prefix in the FIB, based on the name of the Interest, then forwards the Interest out those ports. The forwarder is precluded from forwarding the Interest on the port from which it is received. Call the longest matching FIB forwarding hash FH' and the set of egress interfaces E. As an example, if the FIB is a hash table, the forwarder looks up the FH as the key. If the entry exists and it has no children (meaning that there does not exist a longer match with the Interest's name), the forwarder uses that FIB entry. If the entry has one or more children, the forwarder examines the children to determine if a longer match is possible. The forwarder then removes the Interest's ingress interface from E. The forwarder further looks up the SH/FH' in the PIT. If the Interest's hop limit (as decremented above) is greater than the PIT entries "maximum hop limit", the forwarder sets the PIT entry's maximum hop limit to the Interest's hop limit, and internally marks the Interest as "hop limit extended." If the Interest is not marked as "hop limit extended," the forwarder removes any egress interfaces already used from E. In addition, the forwarder links SH/FH' to SH/FH, if they are different. This may be a one to many mapping relationship. If E is not empty, the forwarder updates the FH in the interest with the longest matching FIB hash, and then forwards the Interest.

If an end-system content producer receives an Interest, it may create a Content Object that satisfies the body of the Interest and return it along the reverse path. The returned object carries the SH/FH received in the Interest. An end system may verify that the SH is properly calculated to match the body of the Interest.

An intermediate forwarder receiving a Content Object first verifies whether the SH and FH of the received Content Object are in the PIT. If they are not, the forwarder drops the Content Object. The forwarder then verifies that the Content Object arrived from a port over which a corresponding Interest was previously forwarded, or over which the corresponding Interest could have been forwarded. If this condition is not met, the forwarder drops the Content Object.

If the forwarder implements a Content Store, the forwarder adds the object to the store if the object's holdtime permits it. Then the forwarder forwards the object along the reverse path, label swapping the object's FH to the reverse path's FH, except if the reverse path FH was the default route (empty) in which case the forwarder does not change the FH. This is done by following the links from SH/FH' to SH/FH, if any exists. Subsequently, the forwarder consumes the PIT entries satisfied by the Content Object.

An end system receiving a Content Object should verify that the Content Object actually satisfies the original Interest. It should also verify the integrity of the Content Object's hash and signature.

FIG. 2 illustrates an exemplary hash-forwarding header for a CCN packet, in accordance with an embodiment of the present invention. In this example, a CCN packet 200 includes a payload portion 208 and a hash forwarding header, which in turn can include a holdtime field 202, an FH field 204, an SH field 206. Payload portion 208 may include the full CCN content name (i.e., HSVLI), and additional fields associated with an Interest or Content Object.

Holdtime field 202 indicates the holdtime which is a suggested maximum time to hold the message at a forwarder. For an Interest, the holdtime is the desired time to keep the Interest in the PIT until a response comes. For a Content Object, the holdtime is the maximum time to keep the Content Object in the fast response cache.

In one embodiment, the Similarity Hash is only computed by the source node, and optionally verified by an authoritative source node generating content or responding from a long-term repository. The Similarity Hash can use the SHA-256 hashing algorithm.

The Forwarding Hashes can be computed in a similar way. The Forwarding Hash is used and possibly computed by forwarding nodes based on entries in their FIB table. Speed of computation is important, and collision resistance only needs to be good enough to distinguish between allowed routing names. In one embodiment, the Forwarding Hash uses FNV-1a 128-bit [FNV] with the standard FNV_offset and FNV_prime:

$$FNV\_prime = 2^{}88 + 2^{}8 + 0 \times 3B$$
$$= 309{,}485{,}009{,}821{,}345{,}068{,}724{,}781{,}371$$
$$= 0 \times 00000000\ 01000000\ 00000000\ 0000013B;$$

and $$FNV\_offset = 144{,}066{,}263{,}297{,}769{,}815{,}596{,}495{,}629{,}667{,}062{,}367{,}629$$
$$= 0 \times 6C62272E\ 07BB0142\ 62B82175\ 6295C58D.$$

To compute a Forwarding Hash over a CCN name, the system can run the FNV-1a 128-bit over each name component using the flatname format, in cumulative order, to the desired number of components.

Figure 3:
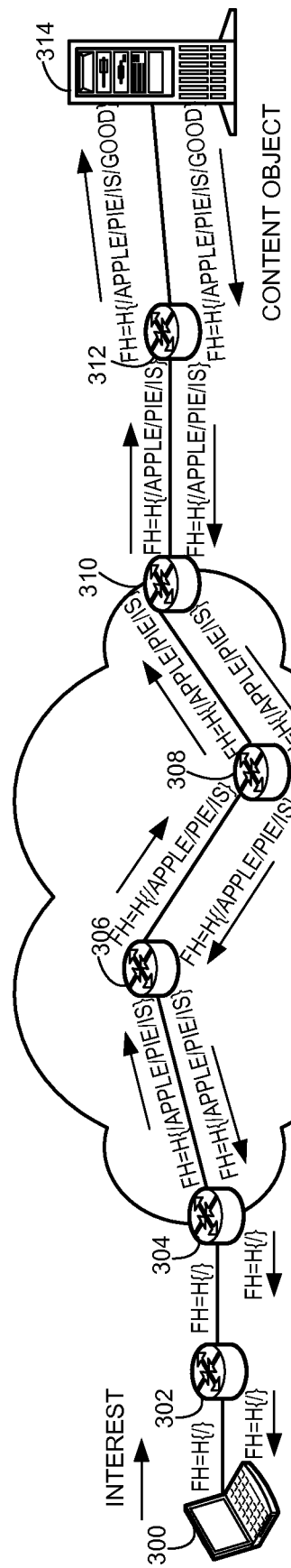
FIG. 3 illustrates the process of hash-based forwarding an Interest and a corresponding Content Object, in accordance with an embodiment of the present invention.

FIG. 3 illustrates the process of forwarding an Interest and a corresponding Content Object, in accordance with an embodiment of the present invention. In this example, a client end system 300 is coupled to a network 300 and wishes to obtain content named /apple/pie/is/good from a content server 314. A number of forwarding nodes, such as forwarders 302, 304, 306, 308, 310, and 312, couple end system 300 with content server 314. In one embodiment, these forwarders can be IP routers. In this example, forwarders 302 and 312 can be enterprise gateway routers for the respective enterprise networks associated with end system 300 and content server 314. Forwarders 304 and 310 can be edge routers providing access into core network 300 to the enterprise networks.

During operation, end system 300 initiates an Interest for /apple/pie/is/good. Assuming that end system 300 has no knowledge about how to forward the Interest packet, end system 300 forwards the Interest to the default gateway router 302, setting the Interest's FH to H{/}, that is, the FH is computed based on the highest hierarchy "I" in the HSVLI. Gateway router 302 also has no specific routing information on how to forward the Interest for /apple/pie/is/good, so it forwards it to edge router 304 with the same FH. Assuming that edge router 304 has routing information for /apple/pie/is, edge router then replaces the Interest's FH with H{/apple/pie/is}. Subsequently, core routers 306 and 308 can forward the Interest based on this updated FH through core network 300 without having to parse the full HSVLI, using an exact match of the FH in their respective FIB. When the Interest reaches edge router 310, edge router 310 forwards the Interest, based on the same FH=H{/apple/pie/is/good}, to gateway router 312, which is within the enterprise network where content server 314 resides. Since gateway router 312 has the routing information for the full HSVLI /apple/pie/is/good, gateway router 312 replaces the FH with H{/apple/pie/is/good}, and forwards the Interest to content server 314.

When content server 314 returns a Content Object, it sets the Content Object's SH to be the same SH as the Interest, and the FH to be H{/applie/pie/is/good}. Subsequently, the Content Object is reverse-path forwarded back to end system 300. At each hop, the FH of the Content Object is updated so that it matches the FH of the Interest that was previously received on the same link where the Content Object is to be forwarded. For example, at router 312, the Content Object's FH is replaced with H{/apple/pie/is}, and at edge router 304 the FH is again replaced with H{/}. This reverse-path forwarding mechanism ensures that the Content Object travels along the same data path on which the Interest has traveled, and hence can prevent any malicious entity from tampering with or spoofing the returned Content Object.

Figure 4:
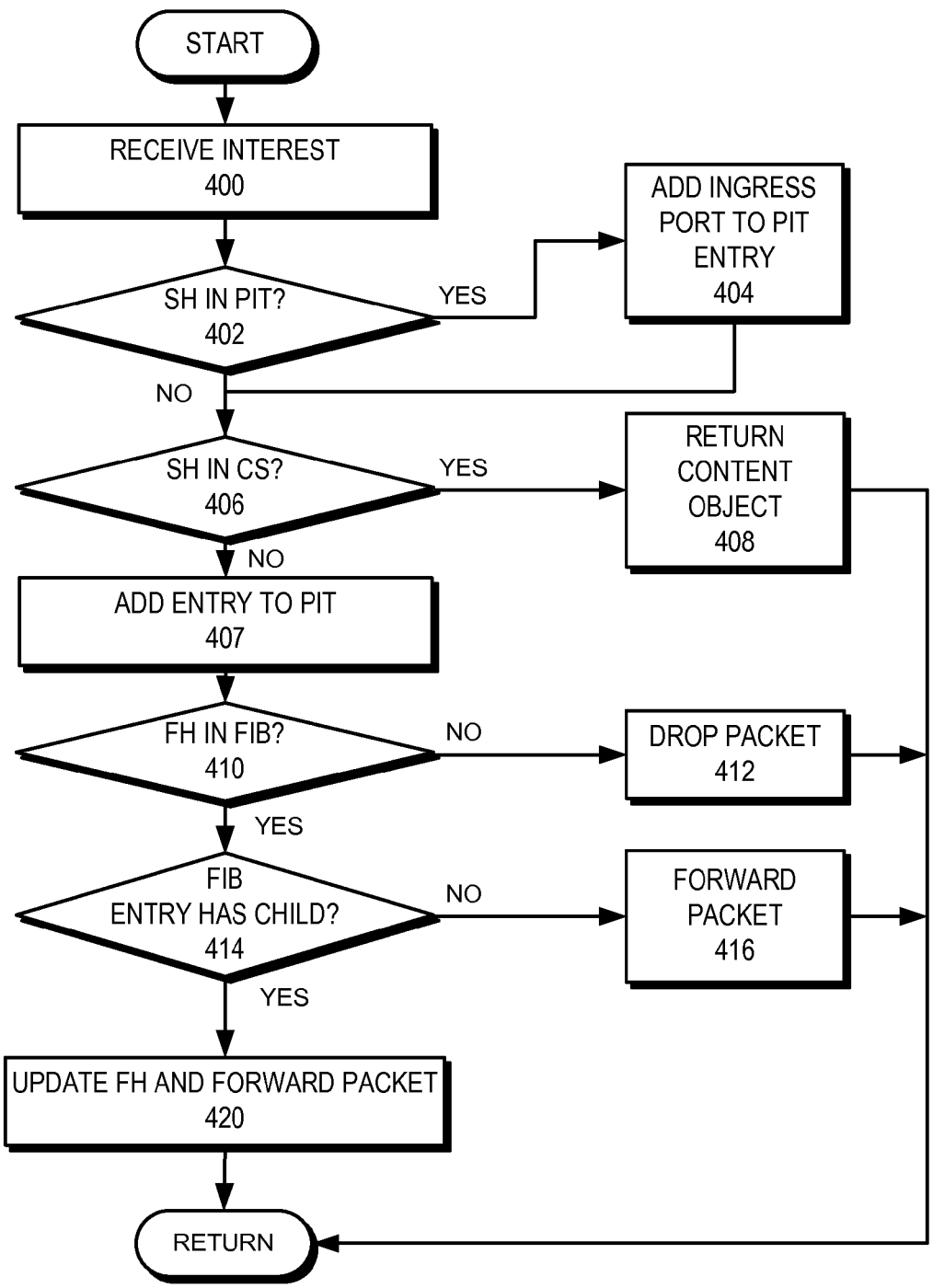
FIG. 4 presents a flow chart illustrating the process of receiving and forwarding an Interest, in accordance with an embodiment of the present invention.

FIG. 4 presents a flow chart illustrating the process of receiving and forwarding an Interest, in accordance with an embodiment of the present invention. During operation, the system receives an Interest (operation 400). The system then determines whether the SH of the Interest is in the PIT (operation 402). If so, the system adds the ingress port on which the Interest is received to the corresponding PIT entry (operation 404). Otherwise, the system further determines whether the content corresponding to the SH is in the local Content Store (operation 406). If so, the system returns the matching Content Object (operation 408). If not, the system then adds a corresponding entry to the PIT (operation 407).

Next, the system determines whether the Interest's FH is in the FIB (operation 410). If the FH is not in the FIB, the system drops the Interest packet (operation 412). If the FH is in the FIB, the system further determines whether the corresponding FIB entry has a child, which means that the FIB contains a longer prefix match than the current FH indicates (operation 414). If the FIG entry does not have a child, the system forwards the Interest packet based on the egress port indicated by the FIB entry (operation 416). If the FIB entry has a child, the system then updates the Interest packet's FH based on the longer prefix match indicated by the child by rehashing the matched prefix, and forwards the packet accordingly (operation 420).

Figure 5:
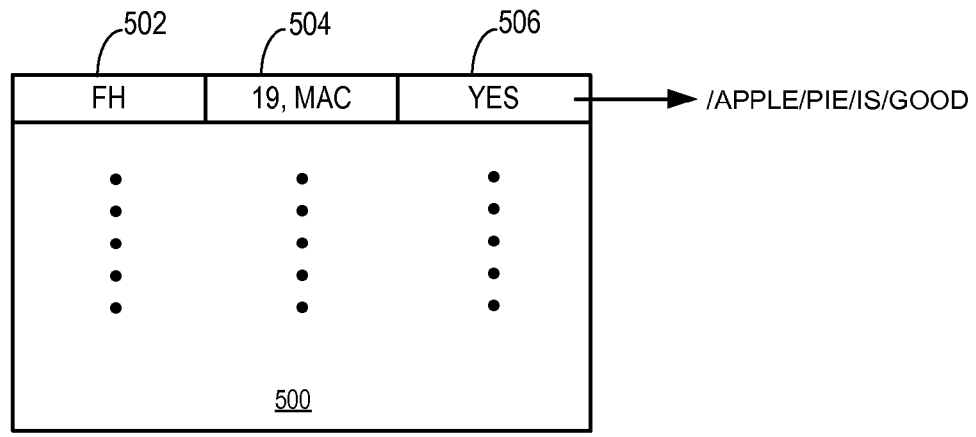
FIG. 5 illustrates an exemplary forwarding information base (FIB), in accordance with an embodiment of the present invention.

FIG. 5 illustrates an exemplary forwarding information base (FIB), in accordance with an embodiment of the present invention. In this example, a FIB 500 includes an FH column 502, an egress port(s) column 504, and a child indication column 506. FH column 502 stores the FHs for which the FIB maintains the proper forwarding (i.e., egress port(s)) information. Egress port(s) column 504 indicates one or more egress ports via which an Interest packet can be forwarded, and the corresponding MAC address of the device(s) on the other end of the link corresponding to each egress port.

Child indication column 506 stores an indicator which indicates whether the forwarder has a longer prefix match for the HSVLI associated with the current FH. In one embodiment, child indication column 506 stores a pointer to the longer prefix match, based on which the system can re-compute the FH.

Figure 6:
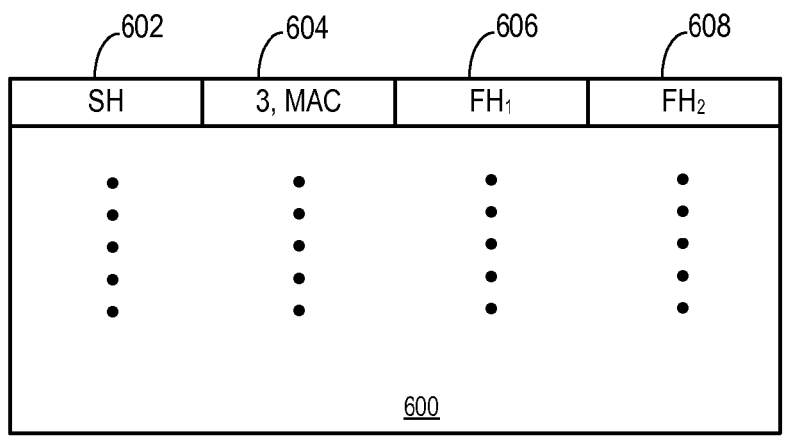
FIG. 6 illustrates an exemplary pending Interest table (PIT), in accordance with an embodiment of the present invention.

FIG. 6 illustrates an exemplary pending Interest table (PIT), in accordance with an embodiment of the present invention. In this example, a PIT 600 includes an SH column 602, an ingress port(s) column 604, an egress FH column 606, and an ingress FH column 608. SH column 602 stores the SH for a pending Interest and is used to look up an pending Interest in PIT 600. Ingress port(s) column 604 indicates one or more ingress ports on which an Interest is received and the corresponding MAC address(es) of the device coupled to the corresponding egress port. These ports will be used to send back the Content Objects corresponding to the pending Interest. Egress FH column 606 indicates the FH a corresponding received Content Object should have, which is used to confirm that the Content Object is received via the correct reverse path. Ingress FH column 608 indicates the new FH that should be used to update the old FH of a received Content Object. Note that the terms "egress" and "ingress" are used here with reference to the corresponding Interest, not the Content Object.

Figure 7:
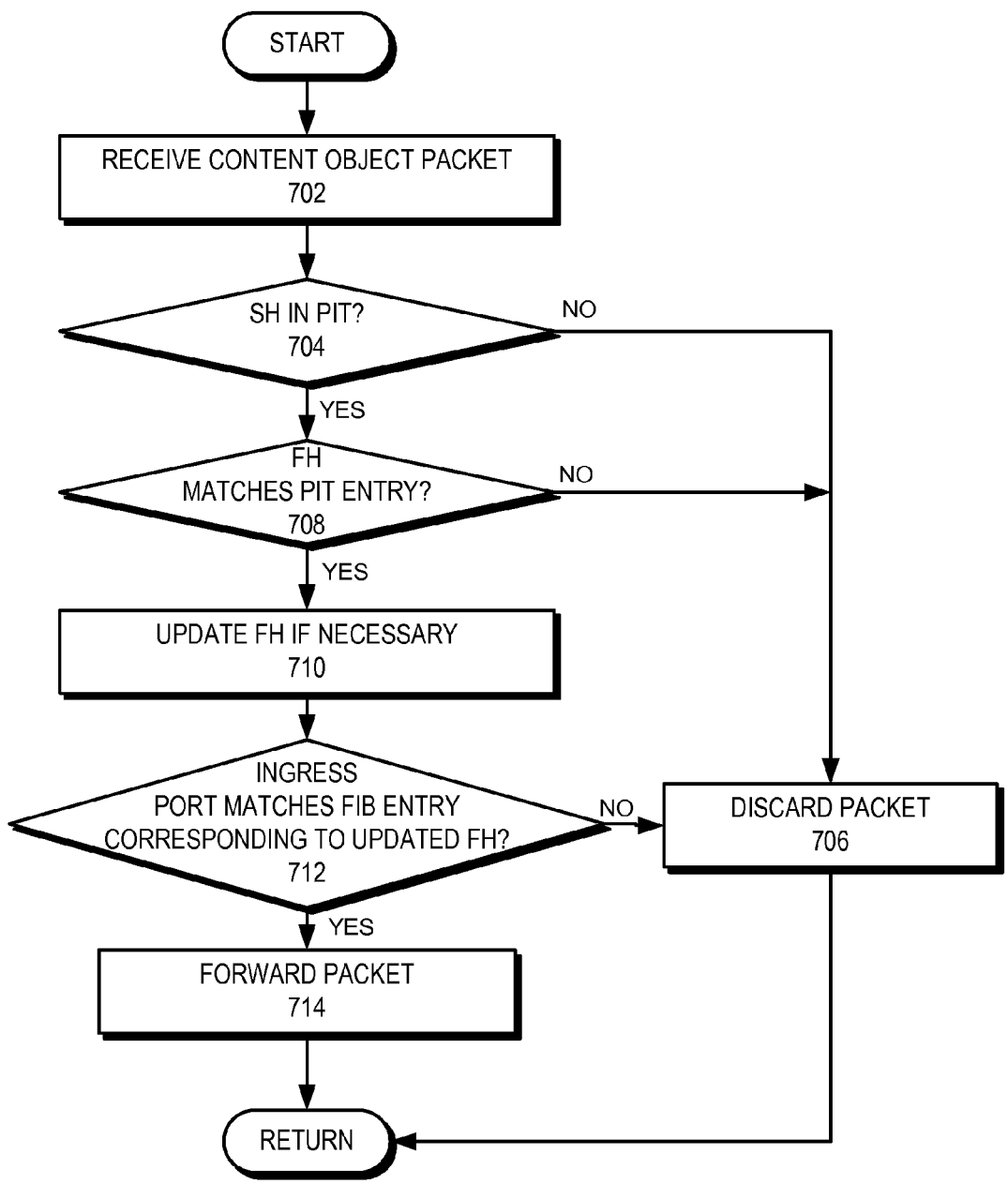
FIG. 7 presents a flow chart illustrating an exemplary process of receiving and forwarding a Content Object, in accordance with an embodiment of the present invention.

FIG. 7 presents a flow chart illustrating an exemplary process of receiving and forwarding a Content Object, in accordance with an embodiment of the present invention. During operation, the system first receives a Content Object packet (operation 702). The system then determines whether the SH of the Content Object is in the PIT (operation 704). If it is not in the PIT, the system discards the packet (operation 706). Otherwise, the system further determines whether the FH in the Content Object matches the egress FH (corresponding to egress FH column 606 in FIG. 6) in the corresponding PIT entry (operation 708). If not, the system discards the packet (operation 706). Otherwise, the system updates the Content Object's FH, if the corresponding PIT entry indicates that a different FH should be used for the Content Object before it is sent out (corresponding to ingress FH column 608 in FIG. 6) (operation 710).

Subsequently, the system determines whether the ingress port on which the Content Object is received matches the FIB entry corresponding to the updated FH (operation 712). If not, the system discards the packet (operation 706). Otherwise, the system forwards the Content Object packet to the ports indicated by the PIT entry (corresponding to ingress port(s) column 604 in FIG. 6) (operation 714).

Figure 8:
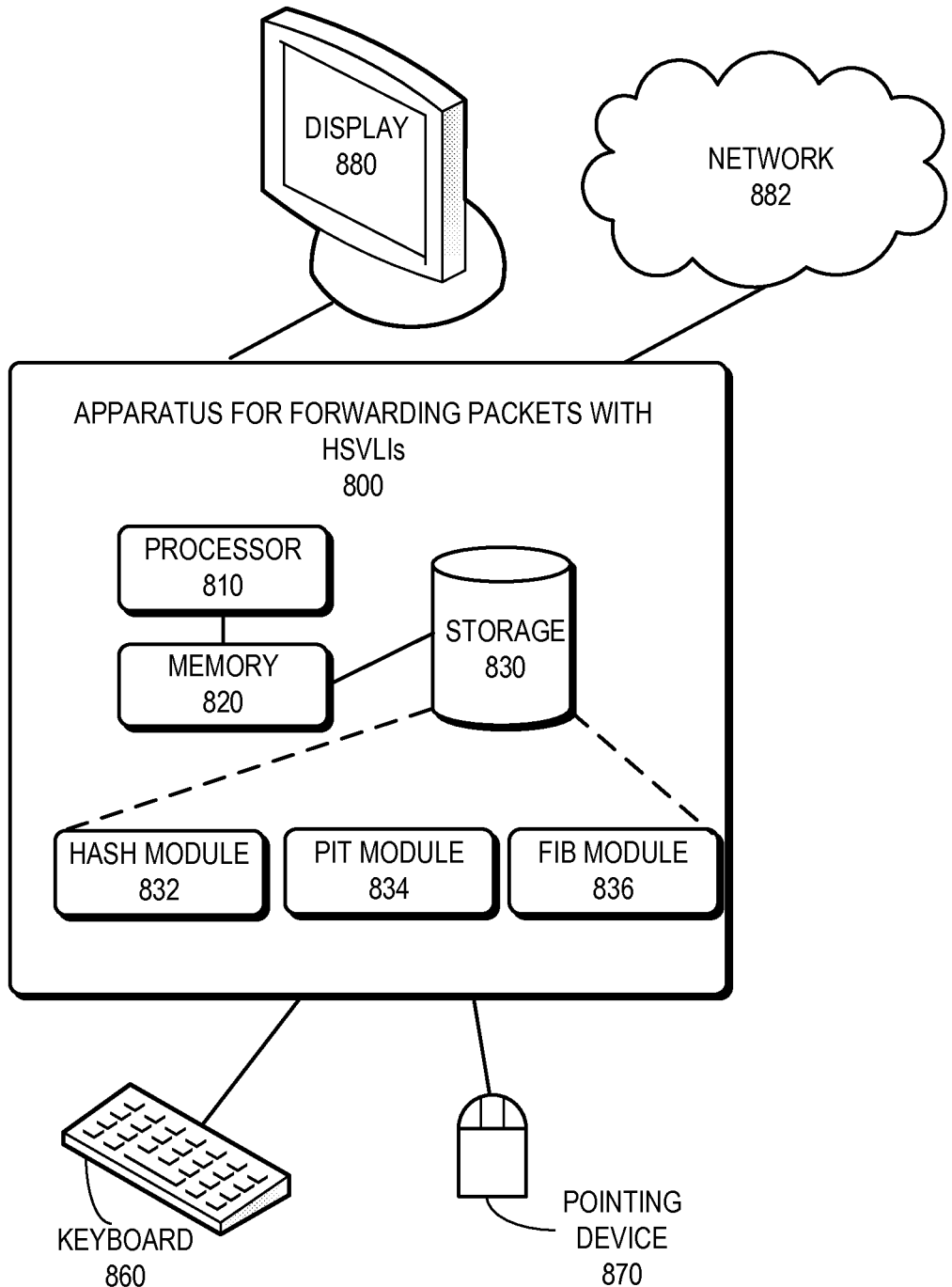
FIG. 8 illustrates an exemplary system for forwarding packets with HSVLIs, in accordance with an embodiment.

FIG. 8 illustrates an exemplary system for forwarding packets with HSVLIs, in accordance with an embodiment. A system 800 for forwarding packets with HSVLIs comprises a processor 810, a memory 820, and a storage 830. Storage 830 typically stores instructions which can be loaded into memory 820 and executed by processor 810 to perform the hash-forwarding methods mentioned above. In one embodiment, the instructions in storage 830 can implement a hash module 832, a PIT module 834, and a FIB module 836, all of which can be in communication with each other through various means.

In some embodiments, modules 832, 834, and 836 can be partially or entirely implemented in hardware and can be part of processor 810. Further, in some embodiments, the system may not include a separate processor and memory. Instead, in addition to performing their specific tasks, modules 832, 834, and 836, either separately or in concert, may be part of general- or special-purpose computation engines.

Storage 830 stores programs to be executed by processor 810. Specifically, storage 830 stores a program that implements a system (application) for performing hash-based forwarding of packets with HSVLIs. During operation, the application program can be loaded from storage 830 into memory 820 and executed by processor 810. As a result, system 800 can perform the functions described above. System 800 can be coupled to an optional display 880, keyboard 860, and pointing device 870, and also be coupled via one or more network interfaces to network 882.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-executable method for forwarding packets with hierarchically structured variable-length identifiers (HSVLIs) over a local area network, the method comprising:
   receiving a registration message from a content server, wherein the registration message includes a packet containing an HSVLI, and wherein a destination media access control (MAC) of the registration message is a group MAC address;
   creating an entry in a forwarding information base corresponding to the HSVLI, wherein the entry indicates a MAC address of the content server and a port on which the registration message is received;
   receiving an interest packet from a client which includes the HSVLI, wherein the packet has the group MAC address as its destination MAC address and the client's MAC address as its source MAC address; and
   forwarding the interest packet to the content server, wherein the forwarded interest packet has the content server's MAC address as its destination MAC address and a local switch's MAC address as its source MAC address.

2. The method of claim 1, wherein the interest packet contains:
   a first value which is a hash derived based on the entire HSVLI and optionally additional information in the packet; and
   a second value which is a hash derived on the subset of the HSVLI components.

3. The method of claim 1, further comprising receiving a content object packet from the content server in response to the interest, wherein the content object packet has the switch's MAC address as its destination address and the content server's MAC address as its source address; and
   forwarding the content object packet to the client, wherein the forwarded packet has the client's MAC address as its destination MAC address and the switch's MAC address as its source MAC address.

4. The method of claim 3, further comprising caching the content object packet.

5. The method of claim 1, further comprising:
   maintaining a pending interest table; and
   subsequent to receiving the interest packet, creating an entry in the pending interest table, wherein the entry indicates a port on which the interest packet is received and the client's MAC address.

6. The method of claim 1, further comprising maintaining the forwarding information base, wherein a respective entry in the forwarding information base indicates an egress port and a destination MAC address of a device reachable via the egress port.

7. The method of claim 1, further comprising searching a local content store for content corresponding to the interest packet.

8. A switching system for forwarding packets with hierarchically structured variable-length identifiers (HSVLIs) over a local area network, comprising:
   a processor; and
   a storage device coupled to the processor and storing instructions which when executed by the processor cause the processor to perform a method, the method comprising:
   receiving a registration message from a content server, wherein the registration message includes a packet containing an HSVLI, and wherein a destination media access control (MAC) of the registration message is a group MAC address;

creating an entry in a forwarding information base corresponding to the HSVLI, wherein the entry indicates a MAC address of the content server and a port on which the registration message is received;

receiving an interest packet from a client which includes the HSVLI, wherein the packet has the group MAC address as its destination MAC address and the client's MAC address as its source MAC address; and forwarding the interest packet to the content server, wherein the forwarded interest packet has the content server's MAC address as its destination MAC address and the switching system's MAC address as its source MAC address.

9. The switching system of claim 1, wherein the interest packet contains:
   a first value which is a hash derived based on the entire HSVLI and optionally additional information in the packet; and
   a second value which is a hash derived on the subset of the HSVLI components.

10. The switching system of claim 8, wherein the method further comprises receiving a content object packet from the content server in response to the interest, wherein the content object packet has the switch's MAC address as its destination address and the content server's MAC address as its source address; and
   forwarding the content object packet to the client, wherein the forwarded packet has the client's MAC address as its destination MAC address and the switch's MAC address as its source MAC address.

11. The switching system of claim 10, wherein the method further comprises caching the content object packet.

12. The switching system of claim 8, wherein the method further comprises:
   maintaining a pending interest table; and
   subsequent to receiving the interest packet, creating an entry in the pending interest table, wherein the entry indicates a port on which the interest packet is received and the client's MAC address.

13. The switching system of claim 8, wherein the method further comprises maintaining the forwarding information base, wherein a respective entry in the forwarding information base indicates an egress port and a destination MAC address of a device reachable via the egress port.

14. The switching system of claim 8, wherein the method further comprises searching a local content store for content corresponding to the interest packet.

15. A non-transitory storage medium storing instructions that when executed by a computer cause the computer to perform a method for forwarding packets with hierarchically structured variable-length identifiers (HSVLIs) over a local area network, the method comprising:
   receiving a registration message from a content server, wherein the registration message includes a packet containing an HSVLI, and wherein a destination media access control (MAC) of the registration message is a group MAC address;
   creating an entry in a forwarding information base corresponding to the HSVLI, wherein the entry indicates a MAC address of the content server and a port on which the registration message is received;
   receiving an interest packet from a client which includes the HSVLI, wherein the packet has the group MAC address as its destination MAC address and the client's MAC address as its source MAC address; and
   forwarding the interest packet to the content server, wherein the forwarded interest packet has the content server's MAC address as its destination MAC address and a local switch's MAC address as its source MAC address.

16. The non-transitory storage medium of claim 15, wherein the interest packet contains:
   a first value which is a hash derived based on the entire HSVLI and optionally additional information in the packet; and
   a second value which is a hash derived on the subset of the HSVLI components.

17. The non-transitory storage medium of claim 15, wherein the method further comprises receiving a content object packet from the content server in response to the interest, wherein the content object packet has the switch's MAC address as its destination address and the content server's MAC address as its source address; and
   forwarding the content object packet to the client, wherein the forwarded packet has the client's MAC address as its destination MAC address and the switch's MAC address as its source MAC address.

18. The non-transitory storage medium of claim 17, wherein the method further comprises caching the content object packet.

19. The non-transitory storage medium of claim 15, wherein the method further comprises:
   maintaining a pending interest table; and
   subsequent to receiving the interest packet, creating an entry in the pending interest table, wherein the entry indicates a port on which the interest packet is received and the client's MAC address.

20. The non-transitory storage medium of claim 15, wherein the method further comprises maintaining the forwarding information base, wherein a respective entry in the forwarding information base indicates an egress port and a destination MAC address of a device reachable via the egress port.

21. The non-transitory storage medium of claim 15, wherein the method further comprises searching a local content store for content corresponding to the interest packet.

* * * * *